(12) United States Patent
Dawes et al.

(10) Patent No.: US 8,037,717 B2
(45) Date of Patent: Oct. 18, 2011

(54) METHODS AND APPARATUS FOR PULSED DOPING OR DRYING A SOOT PREFORM

(75) Inventors: Steven B. Dawes, Corning, NY (US); Daniel W. Hawtof, Painted Post, NY (US); Michael T. Murtagh, Horseheads, NY (US); John S. Rosettie, Corning, NY (US); Andrew P. Schermerhorn, Corning, NY (US); Merrill F. Sproul, Big Flats, NY (US); John Stone, III, Painted Post, NY (US); Pushkar Tandon, Corning, NY (US)

(73) Assignee: Corning Incorporated, Corning, NY (US)

( * ) Notice: Subject to any disclaimer, the term of this patent is extended or adjusted under 35 U.S.C. 154(b) by 1198 days.

(21) Appl. No.: 10/053,365

(22) Filed: Oct. 26, 2001

(65) Prior Publication Data
US 2003/0079502 A1    May 1, 2003

(51) Int. Cl.
*C03B 37/023*    (2006.01)

(52) U.S. Cl. ............... 65/379; 65/397; 65/384; 65/415; 65/399

(58) Field of Classification Search ............ 65/397, 65/399, 415, 384, 379
See application file for complete search history.

(56) References Cited

U.S. PATENT DOCUMENTS

| | | | |
|---|---|---|---|
| 3,933,454 A | | 1/1976 | DeLuca ............................ 65/3 |
| 4,118,295 A * | | 10/1978 | Korenowski et al. .......... 216/93 |
| 4,178,347 A * | | 12/1979 | Walker ........................ 423/185 |
| 4,339,256 A * | | 7/1982 | Simms ......................... 65/32.5 |
| 4,557,561 A * | | 12/1985 | Schneider et al. ............ 385/124 |
| 4,575,463 A * | | 3/1986 | Biswas et al. .................. 65/431 |
| 4,579,571 A * | | 4/1986 | Hicks, Jr. ....................... 65/397 |
| 4,586,943 A | | 5/1986 | Kyoto et al. .................. 65/3.12 |
| 4,620,861 A | | 11/1986 | Berkey .......................... 65/3.12 |
| 4,629,485 A | | 12/1986 | Berkey .......................... 65/3.11 |
| 4,693,738 A | | 9/1987 | Hoshikawa et al. ........... 65/3.11 |
| 5,022,904 A * | | 6/1991 | Ishiguro et al. ................ 65/397 |
| 5,043,002 A * | | 8/1991 | Dobbins et al. ................ 65/386 |
| 5,114,338 A * | | 5/1992 | Tsuchiya et al. ............. 432/206 |
| 5,158,587 A | | 10/1992 | Kyoto et al. .................. 65/3.12 |
| 5,217,516 A | | 6/1993 | Ishiguro et al. ............... 65/3.11 |
| 5,259,856 A * | | 11/1993 | Ohga et al. ..................... 65/426 |
| 5,306,322 A | | 4/1994 | Ishikawa et al. .............. 65/3.12 |
| 5,364,428 A | | 11/1994 | Kyoto et al. .................... 65/397 |
| 5,713,979 A * | | 2/1998 | Nicholson et al. ............. 65/424 |
| 5,895,515 A * | | 4/1999 | Ishikawa et al. ............... 65/377 |
| 6,116,055 A | | 9/2000 | Ishikawa et al. ............... 65/399 |
| 6,499,317 B1 * | | 12/2002 | Ikuta et al. ...................... 65/378 |
| 6,535,679 B2 * | | 3/2003 | Yokoyama et al. .......... 385/127 |
| 2004/0091798 A1 * | | 5/2004 | Moore et al. ..................... 430/5 |

FOREIGN PATENT DOCUMENTS

JP    01-286932    11/1989

* cited by examiner

*Primary Examiner* — John Hoffmann
(74) *Attorney, Agent, or Firm* — Randall S. Wayland; Joseph M. Homa; Matthew J. Mason

(57) ABSTRACT

A method of manufacturing an optical waveguide preform includes providing a first process gas atmosphere to a soot preform contained in a vessel. The first atmosphere is held in the vessel for a first reacting time sufficient to at least partially dope or dry the soot preform. The vessel is then at least partially refilled with a second doping or drying atmosphere. The second doping or drying atmosphere is held in the vessel for a second reacting time sufficient to further dope or dry the soot preform.

44 Claims, 10 Drawing Sheets

METHODS AND APPARATUS FOR PULSED DOPING OR DRYING A SOOT PREFORM

FIELD OF THE INVENTION

The present invention relates to methods and apparatus for manufacturing optical waveguides, and, more particularly, to methods and apparatus for doping or drying a soot preform.

BACKGROUND OF THE INVENTION

An optical waveguide or fiber may be drawn from a consolidated glass preform; the glass preform being typically formed by sintering a soot preform. Soot preforms may be formed by suitable methods such as, for example, chemical vapor deposition (CVD). Various dopants may be added to alter the optical properties or other characteristics of the optical waveguide or glass or soot preform. For example, certain halogen-containing compounds may be used as dopants to dope the soot preform during a consolidation process. In one example, a soot preform may be doped with chlorine to modify the viscosity of glass formed from the soot preform. As a further example, a soot preform may be doped with fluorine to reduce the refractive index of a waveguide formed from the soot preform as compared to undoped silica. However, for some applications it is desirable to provide higher levels of doping than may be possible or cost-effectively achieved with known doping methods. Moreover, known processes may create undesirably large amounts of waste gases and may require substantial amounts of costly gases. Similarly, it may be desirable to provide more efficient drying of soot preforms and a reduction in waste gases produced during such drying processes.

SUMMARY OF THE INVENTION

According to method embodiments of the present invention, a method of manufacturing an optical waveguide preform includes providing a first doping atmosphere to a soot preform contained in a vessel. The first doping atmosphere is held in the vessel for a first reacting time sufficient to at least partially dope the soot preform. The vessel is at least partially refilled with a second doping atmosphere. The second doping atmosphere is then held in the vessel for a second reacting time sufficient to further dope the soot preform. This pulsing of dopant atmospheres is referred to herein as "pulsed doping."

According to further method embodiments of the present invention, a method of manufacturing an optical waveguide preform includes providing a doping atmosphere to a soot preform contained in a vessel. Preferably, the doping atmosphere is preferably held in the vessel for a reacting time of between about 1 and 60 minutes; and more preferably between 5 and 30 minutes, to at least partially dope the soot preform. At least a portion of the doping atmosphere is evacuated from the vessel at the end of the reacting time. Preferably, after this, any remaining dopant atmosphere and/or reaction by-products are at least partially exchanged and the vessel is provided with a fresh charge of doping atmosphere. This may be repeated for several additional cycles in a pulsed fashion.

According to further method embodiments of the present invention, a method of manufacturing an optical waveguide preform includes flowing a pulse of a process gas into a vessel to form a doping atmosphere in the vessel about a soot preform. The process gas includes a doping gas. The soot preform is maintained in contact with the doping atmosphere for a reacting time sufficient to at least partially dope the soot preform. After this, preferably at least a portion of the doping atmosphere is evacuated from the vessel at the end of the reacting time. Preferably, this cycle is then repeated. Optionally, the time, temperature, and/or makeup of the process gas may be altered in subsequent pulses.

According to further method embodiments of the present invention, a method of manufacturing an optical waveguide preform includes providing a first drying atmosphere to a soot preform contained in a vessel. The first drying atmosphere is held in the vessel for a first reacting time sufficient to at least partially dry the soot preform. The vessel is at least partially refilled with a second drying atmosphere. The second drying atmosphere is preferably held in the vessel for a second reacting time sufficient to further dry the soot preform. This method is referred to herein as "pulsed drying."

According to further method embodiments of the present invention, a method of manufacturing an optical waveguide preform includes providing a drying atmosphere to a soot preform contained in a vessel. Preferably, the drying atmosphere is held in the vessel for a reacting time of between about 1 and 60 minutes; and more preferably between 5 and 30 minutes, to at least partially drying the soot preform. At least a portion of the drying atmosphere is evacuated from the vessel at the end of the reacting time. Following evacuation, preferably another drying atmosphere is provided to the vessel to further dry the preform.

According to further method embodiments of the present invention, a method of manufacturing an optical waveguide preform includes flowing a pulse of a process gas into a vessel to form a drying atmosphere in the vessel about a soot preform. The process gas includes a drying gas. The soot preform is maintained in contact with the drying atmosphere for a reacting time sufficient to at least partially dry the soot preform. At least a portion of the drying atmosphere is evacuated from the vessel at the end of the reacting time. Following such evacuation, another drying atmosphere is preferably provided to the vessel to further dry the preform.

According to further embodiments of the present invention, an apparatus for manufacturing an optical waveguide preform using a soot preform includes a pressure vessel defining a pressure chamber adapted to contain the soot preform. A supply of process gas including at least one of a dopant gas and a drying gas is provided. A fluid control system of the apparatus includes a flow control device and a pressurizing device. The flow control device is operable to prevent and allow flow of the process gas into and out of the pressure chamber to form an atmosphere about the soot preform. The pressurizing device is operable to pressurize the atmosphere in the pressure chamber. A process controller is operative to control the flow control device and the pressurizing device to pressurize the atmosphere about the soot preform to a selected pressure for a reacting time of between about 1 and 60 minutes; and more preferably between 5 and 30 minutes, to at least partially dope or dry the soot preform; and depressurize the atmosphere about the soot preform at the end of the reacting time. A heater is operable to heat the atmosphere and the preform in the pressure chamber. Preferably, the process controller is also operative to control the flow control device and the pressurizing device to again pressurize the atmosphere about the soot preform for a further reacting time to further dope or dry the soot preform; and depressurize the atmosphere about the soot preform at the end of the further reacting time.

According to further embodiments of the present invention, an apparatus for manufacturing an optical waveguide preform using a soot preform and an atmosphere includes a first pressure vessel, a second pressure vessel and a pressurizing system. The first pressure vessel has inner and outer opposed surfaces. The inner surface defines a first pressure chamber adapted to contain the soot preform and the doping or drying atmosphere. The second pressure vessel surrounds at least a portion of the first pressure vessel. The first and second pressure vessels define a second pressure chamber therebetween. The pressurizing system is operable to pressurize each of the first and second pressure chambers to control a differential between pressures on the inner and outer surfaces of the first pressure vessel. Most preferably, the differential pressure is made to be approximately zero.

Further features, advantages and details of the present invention will be appreciated by those of ordinary skill in the art from a reading of the figures and the detailed description of the preferred embodiments which follow, such description being merely illustrative of the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As used herein, "doping atmosphere" refers to an atmosphere including a "dopant gas" or "doping gas". "Dopant gas" and "doping gas," as used herein, refer to a gas including a desired and suitable dopant (i.e., compound for doping a soot preform). "Drying atmosphere" refers to an atmosphere including a "drying gas". "Drying gas", as used herein, refers to a gas including a desired and suitable drying agent (i.e., compound for drying, i.e., removing water and hydroxyl ions in a soot preform).

Methods and apparatus according to the present invention, i.e., pulsed drying, may be used to dry a soot preform. Advantageously, such pulsed drying may be accomplished with the use of lesser amounts of drying gas, thereby lowering drying process costs. Further, the amount of effluent production is minimized thereby lowering environmental processing costs.

Methods and apparatus according to embodiments of the present invention, i.e., pulsed doping, may be used to dope a soot preform with elevated levels of dopants such as halogens. The doped soot preform may thereafter be sintered to form a glass preform having a correspondingly elevated concentration of the dopant. The dopant in the glass preform may provide certain desirable refractive index characteristics in an optical fiber drawn from the glass preform (e.g., fluorine doping) or may facilitate ease of drawing and lower stress mismatching of the fiber (e.g., chlorine doping). Advantageously, such pulsed doping may be accomplished with the use of lesser amounts of dopant gas. Beneficially the cost of doping the glass is lowered. Further, environmental processing costs are lowered, as less dopant gas goes up the stack.

Figure 1:
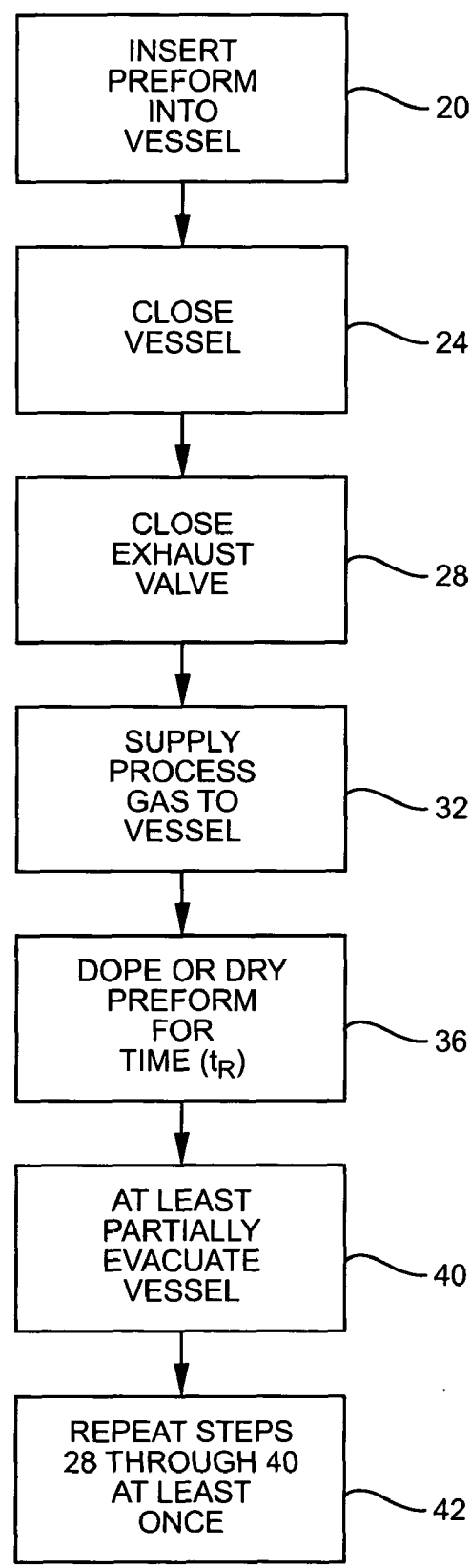
FIG. 1 is a flowchart representing method embodiments according to the present invention.
Figure 2:
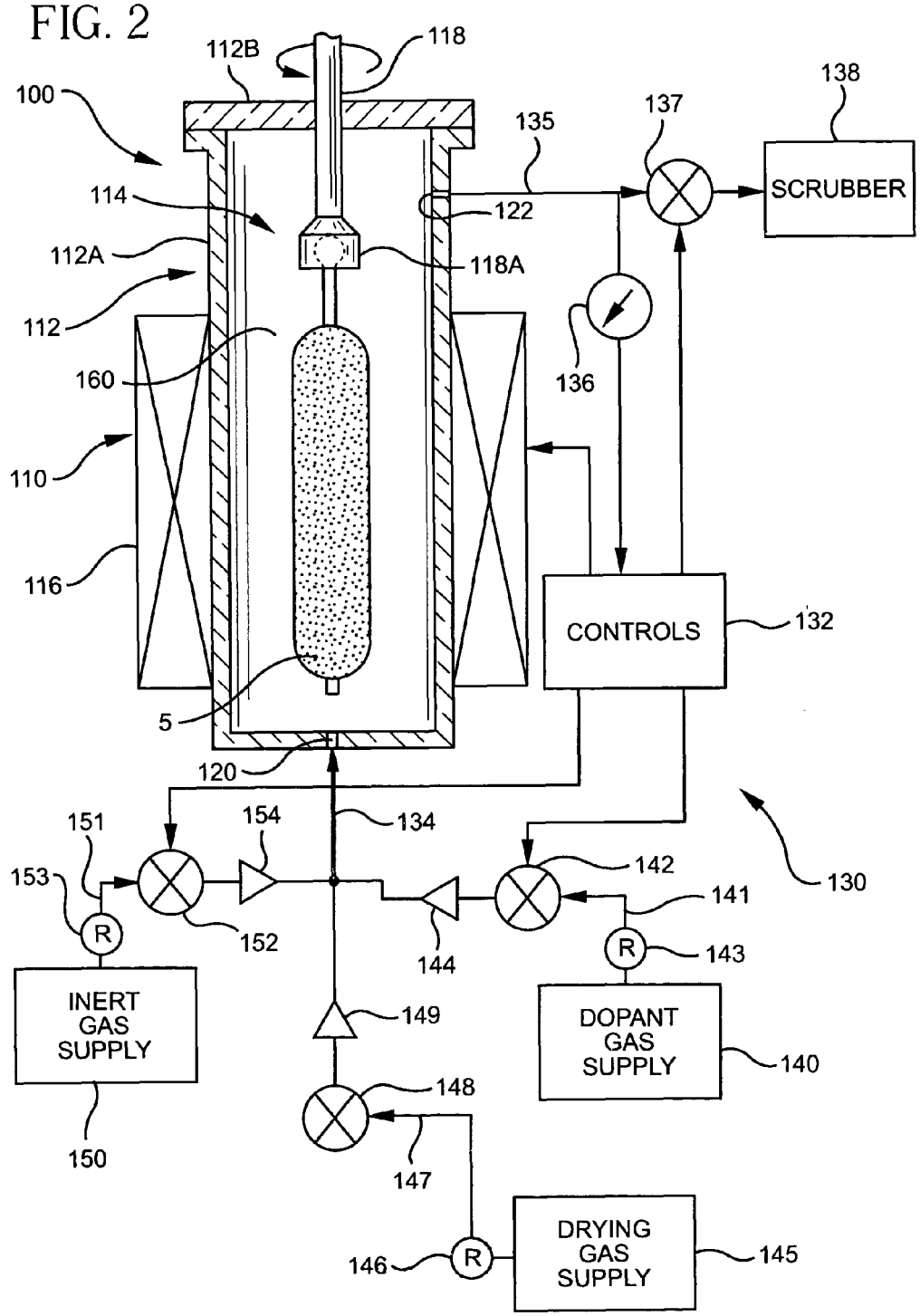
FIG. 2 is a schematic view of a doping and/or drying apparatus according to embodiments of the present invention.

Method embodiments of the present invention for doping or drying a soot preform 5 (FIG. 2) are represented by the flowchart of FIG. 1. A drying and/or doping apparatus 100 according to embodiments of the present invention is shown in FIG. 2 that may be used to execute the methods of FIG. 1. It will be appreciated that the methods may be executed using other apparatus, including the apparatus 200, 300 described hereinbelow. The apparatus 100 will be described immediately below, followed by descriptions of methods according to the present invention for drying and for doping a soot preform.

The drying and/or doping apparatus 100 includes a furnace 110 and a fluid control system 130. The furnace 110 includes a vessel 112. The vessel 112 includes an annular muffle 112A and a preferably removable end cover 112B. The vessel 112 defines a chamber 114 that has an inlet 120 and an outlet 122 each in fluid communication with the chamber 114. The vessel 112 is preferably formed of pure quartz. Preferably, substantially all of the portions or surfaces of the vessel 112 that interface with the chamber 114 are formed of quartz.

There may be relatively small leak paths between the top cover 112B and the muffle 112A and between the handle 118 and cover 112B. As discussed in more detail below, according to certain methods such leak paths may allow a substantially controlled leakage of process gas into or from the chamber 114. It is further contemplated that, in certain embodiments, the end cover 112B and the muffle 112A may be joined or supplemented (e.g., by a sealing device) in such a manner as to form a high-pressure gas-tight seal and the vessel 112 may be otherwise adapted to withstand greater than atmospheric internal pressures.

A quartz handle 118 extends downwardly through a hole in the cover 112B as shown. The handle 118 has a coupling portion 118A from which the soot preform 5 is removably suspended. Preferably, a motor (not shown) is provided to rotate the handle 118 its attached preform 5. The apparatus 100 may be modified to include a sealed assembly with a rotatable handle as discussed with respect to the apparatus 200 hereinbelow.

A heating device 116 partially or fully surrounds a portion of the muffle 112A. The heating device 116 may be, for example, an electrical coil that, in combination with a susceptor, forms an inductive heater. Alternatively, the heating device 116 may be an electrical resistance heater or any other suitable heating device. The heating device should provide sufficient heat to accomplish the process steps of drying and doping as described herein.

The fluid control system 130 includes suitable controls 132 that may be automatically, manually or semi-automatically operated. The system 130 further includes a supply 140 of dopant gas (which, as discussed above and below, may include a suitable dopant), a supply of drying gas 145, and a supply 150 of a carrier or inert gas. The supplies 140, 145, 150 are pressurized and have respective pressure regulators 143, 146 and 153. Conduits or lines 141, 147, and 151, and connect the supplies 140, 145, 150 to a common inlet line 134 that fluidly communicates with the inlet 120 and thereby the chamber 114. A controllable on/off valve 142 and a check valve 144 are provided in the line 141. Similarly, controllable on/off valves 148, 152 and check valves 149, 154 are provided in the lines 147, 151. The controls 132 are operable to open and close the valves 142, 148 and 152 at the appropriate times to accomplish the pulsed doping and/or drying in accordance with the invention.

An exhaust line 135 fluidly connects the outlet 122 and a scrubber 138 or other pollution abatement equipment. An exhaust valve 137 is preferably provided in the line 135. The controls 132 are operable to open and close the exhaust valve 137 for allowing partial or full evacuation or purging of the chamber 114. A pressure gauge sensor 136 is also provided in the line 135 and is connected to the controllers 132 to provide signals thereto. The scrubber 138 may be any suitable device or devices for treating or recycling the gases or portions of the gases exhausted from the chamber 114 as described hereinbelow.

The soot preform 5 may be formed using any suitable method, such as chemical vapor deposition (CVD). Suitable methods for forming soot preforms are known to those of skill in the art and include outside vapor deposition (OVD). For example, U.S. Pat. No. 3,933,454 discloses suitable methods and apparatus for forming a soot preform. The soot preform 5 may be formed of pure silica or may be formed of doped silica (for example, silica doped with a suitable dopant or dopants including, but not limited to, germania, boron, fluorine, antimony, erbium, aluminum, titanium, tantalum and/or chlorine) or combinations thereof. The soot preform 5 is a porous structure defining a plurality of interstices. The soot preform 5 may include a passage extending the full length thereof from which a mandrel of the chemical vapor deposition apparatus has been removed.

Methods of Drying

In accordance with the pulsed drying methods according to the invention, the soot preform 5 is placed in the chamber 114 of the vessel 112 and suspended from the handle 118 (Block 20). The end cover 112B is placed on the muffle 112A and the vessel 112 is closed (Block 24).

Following the vessel closing step (Block 24) the exhaust valve 137 is closed (Block 28). Using the fluid control system 130, a drying gas is supplied to the chamber 114 to form a suitable drying atmosphere 160 in the chamber 114 about the soot preform 5. More particularly, the valves 152, 148 are opened to form a process gas including desired proportions of the inert gas from the supply 150 and the drying gas from the drying gas supply 145 in the line 134. The pressures from the supplies 140, 145 force the process gas into the chamber 114 thereby providing the process gas to the vessel (Block 32).

It should be recognized that in some embodiments, the valve 152 may remain closed so that the process gas includes only the drying gas from supply 145. Suitable drying gases in supply 145 may include a chlorine-containing gas such as $Cl_2$, $SiCl_4$, $GeCl_4$, $SOCl_2$, or $POCl_3$. Other suitable drying gasses may also be employed. Where an inert gas and a chlorine-containing gas are used, the chlorine-containing gas preferably constitutes between about 0.5 and 10 mole % of the combined gas. Suitable inert gases from the inert gas supply 150 may include, for example, He, Ar, Ne or $N_2$.

The controls 132 maintain the valves 148, 152 open and/or operate the heating device 116 to fill the chamber 114 with the desired atmosphere 160 and to heat the atmosphere 160 to a selected drying temperature $T_D$. The valves 148, 152 are then preferably closed to terminate the flow of process gas into the chamber 114.

Ambient Pressure Drying Methods

According to certain drying method embodiments of the invention, the initial pressure (i.e., the pressure at the outset of the step of Block 36) of the atmosphere 160 is at substantially atmospheric pressure or slightly above (e.g., between about 0.0 and 1.1 atm gage) to inhibit the intrusion of ambient air through any leak paths.

At least a portion of the atmosphere 160 including the drying gas is retained in the chamber 114 about the soot preform 5 at the drying temperature $T_D$ for a selected reacting time $t_R$. The drying pressure $P_D$ (in this case, ambient atmospheric pressure or slightly above), the drying temperature $T_D$ and the reacting time $t_R$ are selected to provide a selected level of drying to the soot preform 5 (Block 36). The drying agent present in the process gas diffuses into and reacts with the porous soot preform 5 such that the soot preform 5 is at least partially dried.

Preferably, the exhaust valve 137 is fully closed throughout the reacting time $t_R$. While small leak paths may be present (e.g., between the end cover and the muffle and between the end cover and the handle), these leak paths are preferably minimized to the extent practicable. Preferably, the rate of leakage of the atmosphere 160 out of the chamber 114 during the reacting time $t_R$ is less than 1 slpm; more preferably less than 0.5 slpm; and most preferably less than 0.1 slpm.

Losses may occur in the pressure of the atmosphere 160 over the course of the reacting time $t_R$. Such pressure losses may result from slight leakage as discussed immediately above. In order to compensate for such losses, a drying makeup gas may be added to the chamber 114 during the reacting time $t_R$. The drying makeup gas is preferably an additional amount of the process gas and may be provided from the same supplies and through the same lines as the original process gas from which the atmosphere 160 is formed.

The introduction of the makeup gas may be controlled by the controls 132 which may be responsive to a low pressure signal from the sensor 136 to open the valves 148 and 152 as appropriate. Alternatively, a break valve or the like may be provided in the line 134 and the valves 148, 152 may be opened to provide a selected pressure in the line (typically, ambient pressure or slightly above) such that the break open valve will break open to admit process gas into the chamber 114 when the pressure of the atmosphere 160 drops below atmospheric or a preselected pressure and shut again once the pressure is achieved. Other suitable means and methods for controlling the introduction of makeup gas may be employed.

Preferably, in the case of the method embodiments using a substantially ambient drying pressure, the drying temperature $T_D$ is between about 300 and 1200° C. More preferably, the drying temperature $T_D$ is between 850 and 1100° C. throughout the reacting time $t_R$. Most preferably, the drying temperature $T_D$ remains constant throughout the reacting time $t_R$. However, it should be recognized that the temperature may be varied during the time $t_R$ as well.

Preferably, the reacting time $t_R$ per pulse for drying at substantially ambient pressure is between about 1 and 60 minutes. More preferably, the reacting time $t_R$ per pulse is between about 5 and 30 minutes.

At the end of the reacting time $t_R$, the exhaust valve 137 is opened to evacuate at least a portion of the drying atmosphere 160 (Block 40). Exhaust gases such as $SiF_4$, $Cl_2$, He and/or any remaining reaction by-product gases may be expelled through the outlet 122 to the scrubber 138. Optionally, a flow of the inert gas from supply 150 or other suitable gas may be passed through the vessel 112 to purge the chamber 114 by opening valve 152.

Following the evacuating step (Block 40), the foregoing steps of Block 28 to Block 40 are preferably repeated in a second drying cycle. In this manner, the preform 5 is further dried with the drying agent. Preferably, the second cycle is performed in the same apparatus 100 and the preform 5 and is retained in the chamber 114 between the first and second drying cycles. One or more of the parameters of the supply step (Block 32) and the drying step (Block 36) may be modified. For example, the pressure, the temperature, the drying gas, the relative proportions of the drying and inert gases, and/or the reacting time may be different from those of the first cycle. Each such cycle is referred to as a "pulse" and the entire drying process may include multiple subsequent pulses, for example, greater than three in order to accomplish a suitable amount of drying of the preform 5.

Suitable and preferred inert and drying gases for the second cycle may be as described above with regard to the first cycle. According to certain preferred embodiments, the drying atmospheres of the first and second cycles each include a halogen-containing compound and, more preferably, the same halogen-containing compound. The first and second drying atmospheres may each include a halogen or halogen-containing gas as heretofore described.

Further drying cycles may be performed in the foregoing manner to further dry the preform 5 with the drying agent of the drying gas. The various parameters may be modified as discussed with regard to the second drying cycle. For example, for third and further drying cycles, the drying times may be successively increased or decreased, the drying pressures may be successively increased or decreased, and/or the drying temperatures may be successively increased or decreased.

Notably, the foregoing methods include pulsing of the process gas into the chamber 114 rather than flowing the process gas through the chamber 114 as may be done in known drying methods. By "pulsing", it is meant that a mass or batch of the process gas is flowed into the chamber 114 prior to the beginning of the corresponding reacting time $t_R$, and the flow into the chamber 114 is then interrupted such that flow of process gas through the chamber 114 is fully or substantially reduced throughout the reacting time $t_R$ as compared to the flow of process gas through the chamber 114 before and after the reacting time $t_R$. Restated, the flow of process gas is varied substantially with low or no flow being provided during the reacting time $t_R$. While a drying makeup gas may be introduced into the chamber as discussed above, the rate of flow of the drying makeup gas into the chamber 114 during the reacting time $t_R$ is preferably no more than the rate of flow due to the aforementioned minimal losses. In the case of drying, the reaction of the drying gas with the preform 5 may increase the pressure within the vessel slightly. Thus, dependent upon the degree to seal achieved in the vessel 112, no makeup gas may be required.

Pressurized Drying Methods

According to other drying method embodiments, the atmosphere 160 is pressurized above one atmospheric gage during the step of drying the preform (i.e., during the step of Block 36). This may be accomplished by closing the valve 137 and maintaining the atmosphere 160 at the selected temperature $T_D$, and continuing to flow the process gas into the chamber 114 until the atmosphere 160 attains the appropriate elevated drying pressure $P_D$ (as indicated to the controller 132 by the sensor 136). At the end of the reacting time $t_R$, the drying atmosphere 160 is depressurized by opening the valve 137. The methods may otherwise correspond to the drying method described above, except as noted below. For example, the methods may include two or more drying cycles or pulses, and more preferably three or more cycles or pulses. Moreover, one or more pressurized drying cycles may be combined in series with one or more ambient pressure drying cycles.

Figure 4:
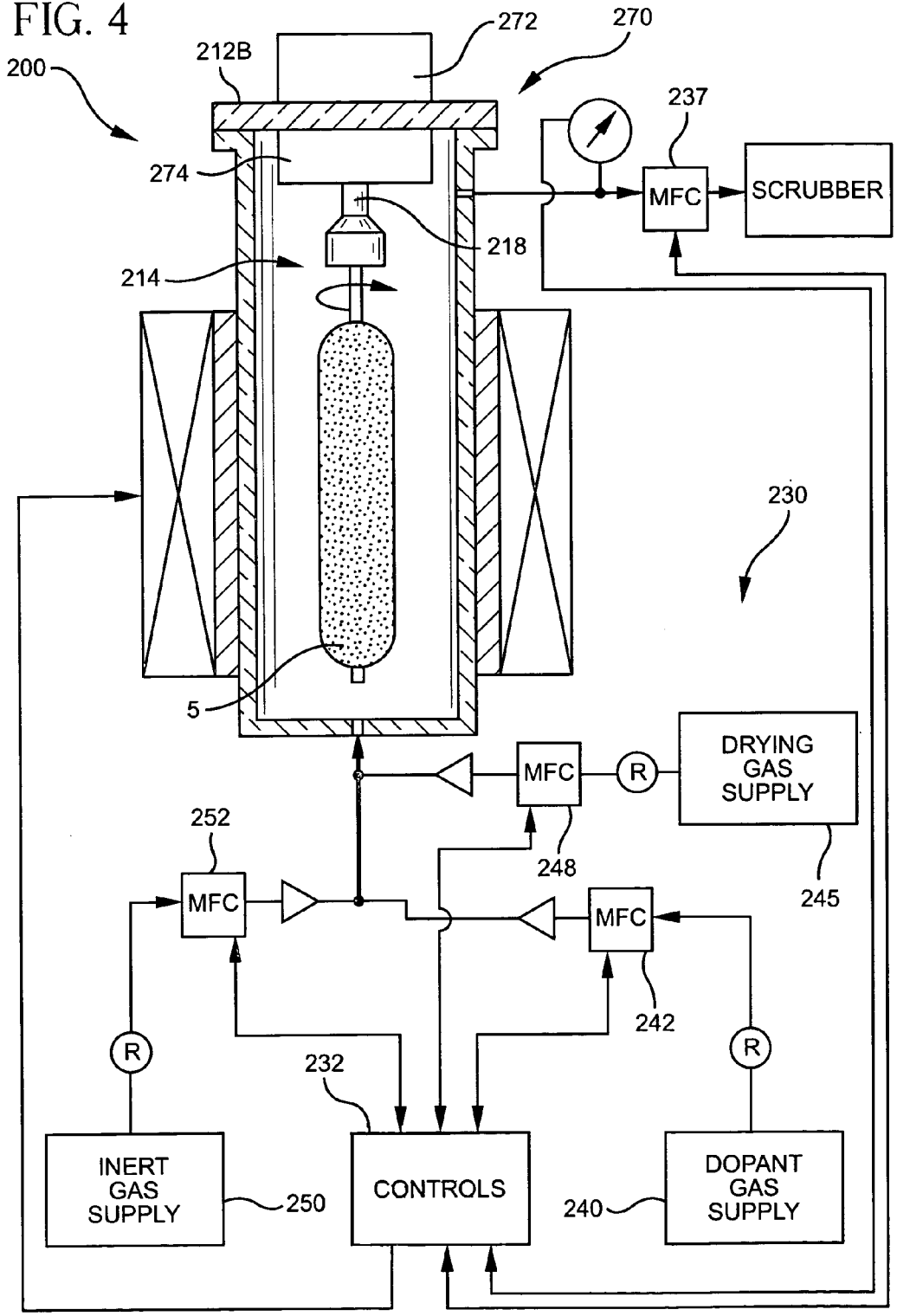
FIG. 4 is a schematic drawing of a doping and/or drying apparatus according to further embodiments of the present invention.

The pressure vessel 112 is preferably sealed gas-tight throughout the reacting time $t_R$. While it is contemplated that enhanced sealing arrangements may be provided to the apparatus 100 and/or decreased leakage rates may be allowed, high-pressure drying apparatus such as the apparatus 200 of FIG. 4 are preferred for drying the preform 5 at pressures significantly exceeding ambient pressure. According to certain preferred embodiments, the atmosphere 160 is held in the chamber 114 throughout the reacting time $t_R$. As used herein, "hold" or "held" means that there is no substantial flow of the atmosphere 160 out of the chamber 114 for a finite period of time (i.e., the reacting time $t_R$) as would occur in the case of a traditional gas flow-through process. More preferably, the rate of flow of the atmosphere 160 out of the chamber 114 during the reacting time $t_R$ is no more than 0.5 slpm; more preferably less than 0.1 slpm; and most preferably, the leakage rate is substantially 0 slpm.

In the methods wherein the atmosphere 160 is pressurized above atmospheric pressure during the step of drying the preform, the drying pressure $P_D$ is preferably between about 0.1 and 5 atm gage. More preferably, the drying pressure $P_D$ is at least 0.1 atm gage, and most preferably at least 0.5 atm gage.

Preferably, in the case of the method embodiments using a substantially greater than ambient drying pressure $P_D$, the drying temperature $T_D$ is between about 300 and 1200° C. More preferably, the drying temperature $T_D$ is between 850 and 1100° C. throughout the reacting time $t_R$. Most preferably, the drying temperature $T_D$ remains constant throughout the reacting time $t_R$; however, the temperature may also be varied as before described.

Preferably, the reacting time $t_R$ for drying at a pressure greater than ambient is between about 1 and 60 minutes per pulse. More preferably, the reacting time $t_R$ per pulse is between about 5 and 30 minutes.

Methods of Doping

In accordance with further embodiments of the invention and with further reference to FIG. 2, methods are provided for efficiently doping a soot preform 5. The doping methods may be conducted using the apparatus 100 as described above. While the same element members are referenced, it will be appreciated from the description herein that, because a doping gas is provided in place of the drying gas, the process gas, atmosphere 160, the temperature $T_D$, the pressure $P_D$, the reacting time $t_D$ are a doping, rather than drying, processing and reacting time.

The soot preform 5 is placed or retained in the chamber 114 and suspended from the handle 118 (Block 20). The end cover 112B is placed on the muffle 112A and the vessel 112 is closed (Block 24).

Preferably, the preform 5 is appropriately dried utilizing the above-described pulsed drying method. Alternatively or additionally, the soot preform 5 may be dried by passing a flow of suitable drying gas through the chamber 114 and about the soot preform 5 to remove water and hydroxyl ions from the soot preform 5. Preferably, the drying gas (preferably a chlorine-containing gas) is provided at a flow rate of between about 0.1 and 1 slpm for a time of between about 30 minutes and 2 hours while the soot preform 5 is maintained at a temperature of between about 300 and 1200° C. and substantially atmospheric pressure. Suitable drying gases include $Cl_2$, $SiCl_4$, $POCl_3$, $GeCl_4$ and $SOCl_2$. Preferably, the drying gas is supplied with an inert gas such as He, wherein the chlorine-containing gas constitutes between about 0.5 and 10 mole % of the combined gas. The combined gas is preferably provided at a flow rate of about 20 slpm. During the drying step, the pressure chamber 114 may be heated using the heating device 116.

Following the vessel closing step (Block 24) and the drying step (if any) the exhaust valve 137 is closed (Block 28). Using the fluid control system 130, a process gas is supplied to the chamber 114 to form a doping atmosphere 160 in the chamber 114 about the soot preform 5. More particularly, the valves 142, 152 are opened to form a process gas including desired proportions of the inert gas from the supply 150 and the dopant gas from the dopant gas supply 140 in the line 134. The pressures from the supplies 140, 150 force the process gas into the chamber 114 thereby providing the process gas to the vessel (Block 32). In some embodiments, the valve 152 may remain closed so that the process gas includes only the dopant gas.

The dopant gas may be any suitable gas. In particular, the dopant gas may be a halogen-containing gas. Suitable halogen-containing gases include $Cl_2$, $GeCl_4$, $SiCl_4$, $SiF_4$, $SF_6$, $CF_4$, $C_2F_6$, $COF_2$, $C_2F_2Cl_2$, and $F_2$. According to certain preferred embodiments, the halogen-containing gas includes a fluorine-containing compound. Preferred fluorine-containing compounds include $SiF_4$, $SF_6$, $CF_4$, $C_2F_6$, $COF_2$, $C_2F_2Cl_2$, and $F_2$. Suitable inert gases from the inert gas supply include He, Ar, Ne and $N_2$, for example.

The controls 132 maintain the valves 142, 152 open and/or operate the heating device 116 to fill the chamber 114 with the doping atmosphere 160 and to heat the doping atmosphere 160 to a selected doping temperature $T_D$. The valves 142, 152 are then closed to terminate the flow of process gas into the chamber 114.

Ambient Pressure Doping Methods

According to certain doping method embodiments of the invention, the initial pressure (i.e., the pressure at the outset of the step of Block 36) of the doping atmosphere 160 is substantially atmospheric pressure or slightly above (e.g., between about 0.0 and 0.1 atm gage) to inhibit the intrusion of ambient air through any leak paths.

At least a portion of the doping atmosphere 160 including the doping gas is retained in the chamber 114 about the soot preform 5 at the doping temperature $T_D$ for a selected reacting time $t_R$. The doping pressure $P_D$ (in this case, ambient atmospheric pressure or slightly above), the doping temperature $T_D$ and the reacting time $t_R$ are selected to provide a selected level of doping to the soot preform 5 (Block 36) per pulse. The doping agent present in the process gas diffuses into and reacts with the porous soot preform 5 such that the soot preform 5 is at least partially doped with the dopant.

Preferably, the exhaust valve 137 is fully closed throughout the reacting time $t_R$. While small leak paths may be present (e.g., between the end cover and the muffle and between the end cover and the handle), these leak paths are preferably minimized to the extent practicable. Preferably, the rate of leakage of the atmosphere 160 out of the chamber 114 during the reacting time $t_R$ is less than 0.5 slpm, and more preferably, less than 0.1 slpm.

Losses may occur in the pressure of the atmosphere 160 over the course of the reacting time $t_R$. Such losses may result from slight leakage as discussed immediately above and/or depletion of the doping gas as a result of the reaction. In order to compensate for such losses, a doping makeup gas may be added to the chamber 114 during the reacting time $t_R$. The doping makeup gas is preferably an additional amount of the process gas and may be provided from the same supplies and through the same lines as the original process gas from which the doping atmosphere 160 is formed. The introduction of the doping makeup gas may be controlled in the same manners as discussed above with regard to control of the doping makeup gas for drying processes, except that the valve 142 is controlled as needed rather than the valve 148.

Preferably, in the case of the method embodiments using a substantially ambient doping pressure, the doping temperature $T_D$ is between about 1000 and 1350° C. throughout the reacting time $t_R$. More preferably, the doping temperature $T_D$ is between 1125 and 1300° C. throughout the reacting time $t_R$. For doping with $F_2$, the temperature may be much lower, for example, between 200 and 1300° C.; more preferably between 1100 and 1300° C. Most preferably, the doping temperature $T_D$ remains constant throughout the reacting time $t_R$; however, alternatively the temperature may be varied over the pulse.

Preferably, in the doping methods using ambient pressure, the reacting time $t_R$ is between about 1 and 60 minutes. More preferably, the reacting time $t_R$ is between about 5 and 30 minutes.

At the end of the reacting time $t_R$, the exhaust valve 137 is opened to evacuate at least a portion of the doping atmosphere 160 (Block 40). Exhaust gases such as $SiF_4$, $CO_2$, $COF_2$, $SO_2$ and/or any remaining reaction by-product gases may be expelled through the outlet 122 to the scrubber 138. Optionally, a flow of the inert gas from supply 150 or other suitable gas may be passed through the vessel 112 to purge the chamber 114.

Following the evacuating step (Block 40), the foregoing steps of Block 28 to Block 40 may be repeated in a second doping cycle. In this manner, the preform 5 is further doped with the doping agent. Preferably, the second cycle is performed in the same apparatus 100 and the preform 5 is retained in the chamber 114 between the first and second doping cycles. One or more of the parameters of the supply step (Block 32) and the doping step (Block 36) may be modified. For example, the pressure, the temperature, the doping gas, the relative proportions of the doping and inert gases, and/or the reacting time may be different from those of the first pulse cycle.

Preferably, the reacting time of the second doping cycle is longer than the reacting time $t_R$ of the first doping cycle. Preferably, the reacting time of the second doping cycle is between about 1 and 60 minutes, and more preferably between about 5 and 30 minutes.

Preferably, the doping temperature of the second doping cycle is between about 1100 and 1300° C. with any $F_2$ doping being performed at a doping temperature as low as 200° C. It should be recognized that the doping temperature of the second doping cycle may be different than the doping temperature $T_D$ of the first doping cycle.

Suitable and preferred inert and dopant gases for the second doping cycle may be as described above with regard to the first doping cycle. According to certain preferred embodiments, the doping atmospheres of the first and second doping cycles each include a halogen-containing compound and, more preferably, the same halogen-containing compound. The first and second doping atmospheres may each include a fluorine-containing compound, preferably selected from the group consisting of $SiF_4$, $SF_6$, $CF_4$, $C_2F_6$, $COF_2$, $C_2F_2Cl_2$, and $F_2$.

Further doping cycles may be performed in the foregoing manner to further dope the preform 5 with the doping agent of the doping gas. The various parameters may be modified as discussed with regard to the second doping cycle. For example, for third and even further doping cycles, the per pulse doping times, per pulse doping pressures, and/or the per pulse doping temperatures may be successively increased or decreased.

Notably, the foregoing methods include pulsing (as defined above) of the process gas into the chamber 114 rather than flowing the process gas through the chamber 114 as may be accomplished. While a doping makeup gas may be introduced into the chamber as discussed above, the rate of flow of the doping makeup gas into the chamber 114 during the reacting time $t_R$ is preferably no more to offset the drop in pressure in the chamber 114 during the pulse cycle.

Pressurized Doping Methods

According to other embodiments, the doping atmosphere 160 is pressurized to a pressure above atmospheric pressure during the step of doping the preform (i.e., during the step of Block 36). This may be accomplished by maintaining the atmosphere 160 at the selected temperature $T_D$, and continuing to flow the process gas into the chamber 114 until the atmosphere 160 attains the appropriate elevated doping pressure $P_D$ (as indicated to the controller 132 by the sensor 136). At the end of the reacting time $t_R$ for the pulse, the doping atmosphere 160 is preferably depressurized by opening the valve 137. The methods may otherwise correspond to the doping methods described above, except as noted below. For example, such methods may include two or more doping cycles. Moreover, one or more pressurized doping cycles may be combined in series with one or more ambient pressure doping cycles, if desired.

The pressure vessel 112 is preferably sealed gas-tight throughout the per pulse reacting time $t_R$. While it is contemplated that enhanced sealing arrangements may be provided to the apparatus 100 and/or decreased leakage rates may be allowed, high-pressure doping apparatus such as the apparatus 200 of FIG. 4 are preferred for doping the preform 5 at pressures significantly exceeding ambient pressure. According to certain preferred embodiments, the doping atmosphere 160 is held (as defined above) in the chamber 114 throughout the reacting time $t_R$. More preferably, the rate of flow of the doping atmosphere 160 out of the chamber 114 during the reacting time $t_R$ is no more than 0.5 slpm; more preferably less than 0.1 slpm; and most preferably, the leakage rate is approximately 0 slpm.

In the doping methods wherein the doping atmosphere 160 is pressurized above atmospheric pressure during the step of doping the preform, the doping pressure $P_D$ is preferably between about 0.1 and 20 atm gage; more preferably, the doping pressure $P_D$ is between 0.5 and 10 atm gage; and most preferably between 0.5 and 5 atm gage.

Preferably, in the case of the method embodiments using a substantially greater than ambient doping pressure, the doping temperature $T_D$ is between about 1100 and 1300° C. throughout the reacting time $t_R$. More preferably, the doping temperature $T_D$ is between 1125 and 1300° C. throughout the reacting time $t_R$. As described before herein, fluorine doping with $F_2$ may be accomplished at temperature as low as 200° C.

Most preferably, the doping temperature $T_D$ remains constant throughout the reacting time $t_R$; however, the temperature may be varied as well to control the profile of the refractive index of the resulting optical fiber.

Preferably, in doping methods using pulsed pressures greater than ambient doping pressure, the reacting time $t_R$ per pulse is between about 1 and 60 minutes. More preferably, the reacting time $t_R$ per pulse is between about 5 and 30 minutes.

As noted above, a second or further doping cycle may be employed, for example a second or further doping cycle using a doping pressure greater than ambient pressure. Suitable and preferred doping pressures for the second and further doping cycles are preferably the same as described above for the first doping cycle. Alternatively, the doping pressure of the second or further doping cycle may be different than the doping pressure for the corresponding first doping cycle.

Preferably, the reacting time of the second doping cycle and any further doping cycle is longer than the reacting time $t_R$ of the first doping cycle. Preferably, the reacting time of the second and any further doping cycle is between about 1 and 60 minutes, and more preferably between about 5 and 30 minutes.

Preferably, the doping temperature of the second and any further doping cycle is between about 1125 and 1300° C., except for $F_2$ which may be as low as 200° C. The doping temperature of the second and any further doping cycle may be different than the doping temperature $T_D$ of the first doping cycle.

While the apparatus 100 and the apparatus 200 (discussed below) include both a drying gas supply and delivery system and a doping gas supply and delivery system and the methods as discussed above include both pulsed drying and pulsed doping processes, the apparatus and methods may be adapted to provide only pulsed drying or only pulsed doping. For example, the apparatus and methods of the present invention may be used to provide pulsed drying, followed by doping using other doping methods, or without any doping process. Similarly, the apparatus and methods of the present invention may be used to provide pulsed doping, preceded by conventional drying methods, or without drying. However, it will be appreciated from the description herein that the provision of doping and drying supply and delivery systems associated with a common process vessel and the use of both pulsed drying and pulsed doping in combination may provide a number of advantages.

Following the last pulse doping step or, if no doping is desired, the last pulse drying step, the soot preform 5 may be sintered (i.e., consolidated) to form a glass preform. The sintering step may include heating the doped and/or dried soot preform 5 in the pressure chamber 114 using the heating device 116 and/or another heating device to sinter the soot preform 5 using known or other suitable techniques. Preferably, the sintering step includes heating the soot preform 5 to a temperature of between about 1250 and 1600° C. It should be recognized, however, that for some preform compositions, small amounts of partial sintering may occur during the drying and/or doping steps.

Preferably, the preform is retained in the chamber 114 throughout and between each of the flow drying step (if any), the doping (or drying) cycle or cycles, and the sintering step.

In known manner, the doped and/or dried glass preform may be drawn and sectioned to form a glass cane. A second, outer layer of doped or undoped silica soot may be deposited about the glass cane using a suitable deposition method such as OVD. The outer soot layer may be in turn optionally doped and/or dried as described above and consolidated about the glass cane to form a multi-layered glass preform.

Notably, by utilizing the pulsed doping and drying methods in accordance with the invention and holding the doping or drying gases in the chamber 114 throughout the reacting times of each doping or drying cycle, the amount of unreacted process gas exhausted may be substantially reduced. Moreover, the overall amount of the exhaust gases is also substantially reduced. Accordingly, the significant cost of the dopant or drying gas and the significant cost of treating, recycling or disposing of the exhaust gases may be correspondingly reduced. By utilizing pulsed doping and pulsed drying in combination with elevated pressures, improved doping and/or drying may be efficiently achieved.

Figure 9:
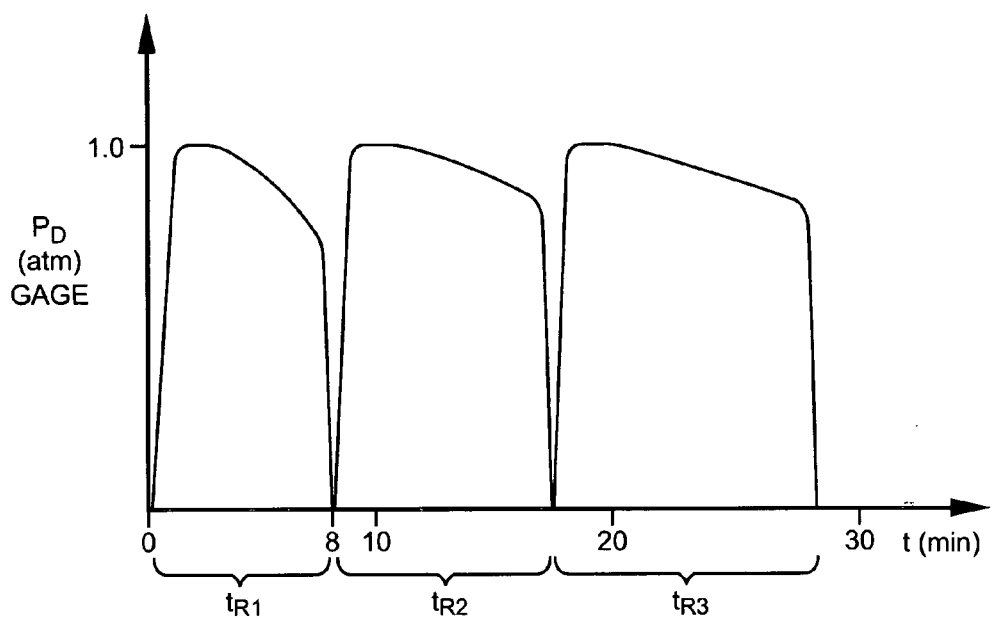
FIG. 9 is a graph of doping or drying pressure over time for further methods according to the present invention.

If the vessel 112 is maintained fully closed as described above, the doping or drying pressure $P_D$ (i.e., the total pressure of the doping or drying atmosphere 160) in the chamber 114 may drop as the reaction proceeds over the reacting time. This because at least a portion of the dopant or drying agent will diffuse into and react with the soot preform 5, thereby reducing the partial pressure $PP_D$ of the dopant or drying gas. As a result, the doping or drying pressure $P_D$ over time t may be as shown in FIG. 9 for three exemplary pulse doping (or drying) cycles (wherein $t_{r1}$ is the reacting time for the first doping or drying cycle, $t_{r2}$ is the reacting time for the second doping or drying cycle, and $t_{r3}$ is the reacting time for the third doping or drying cycle). For each cycle, the doping or drying atmosphere 160 is pressurized to 1.0 atm gage, for example, held for the reacting time without introducing additional gas, and released to atmospheric pressure (i.e., 0 atm gage), for example, at the end of the respective pulsed reacting time.

Figure 10:
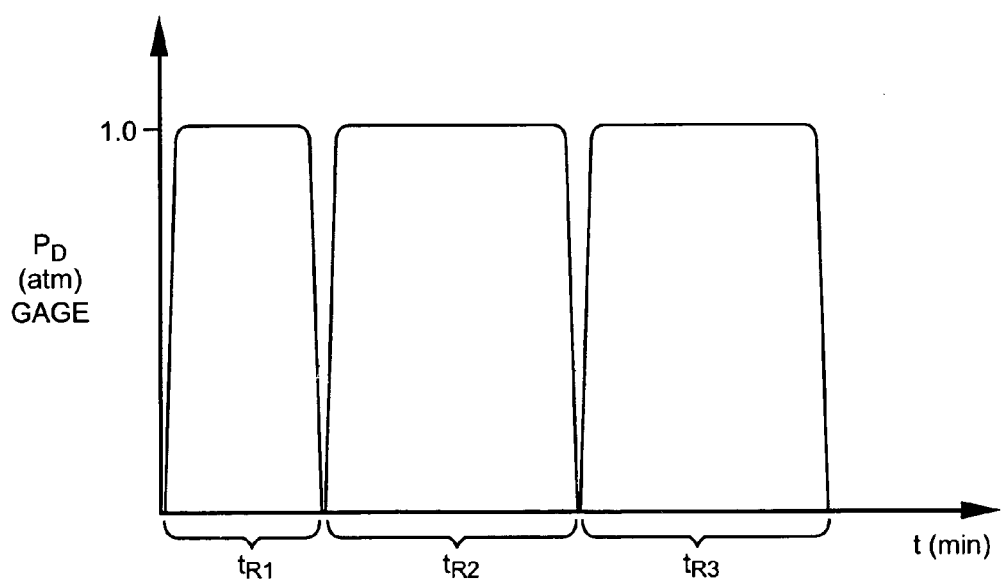
FIG. 10 is a graph of doping or drying pressure over time for further methods according to the present invention.

It may be desirable to maintain the doping or drying pressure $P_D$ at a constant value (or above a selected threshold) throughout each reacting time. This may be advantageous to promote controlled doping/drying and/or to reduce unwanted cyclic mechanical stresses on the vessel 112. With reference to FIG. 10, according to some embodiments of the invention, additional gas is flowed into the chamber 114 to maintain the doping or drying pressure $P_D$ at or substantially at a selected value throughout the reacting time. In this manner, the method compensates for the depletion of the dopant or drying gas during the reacting time. The additional gas may include the inert gas, the dopant gas (for doping processes), the drying gas (for drying processes), and/or another gas.

Figure 11:
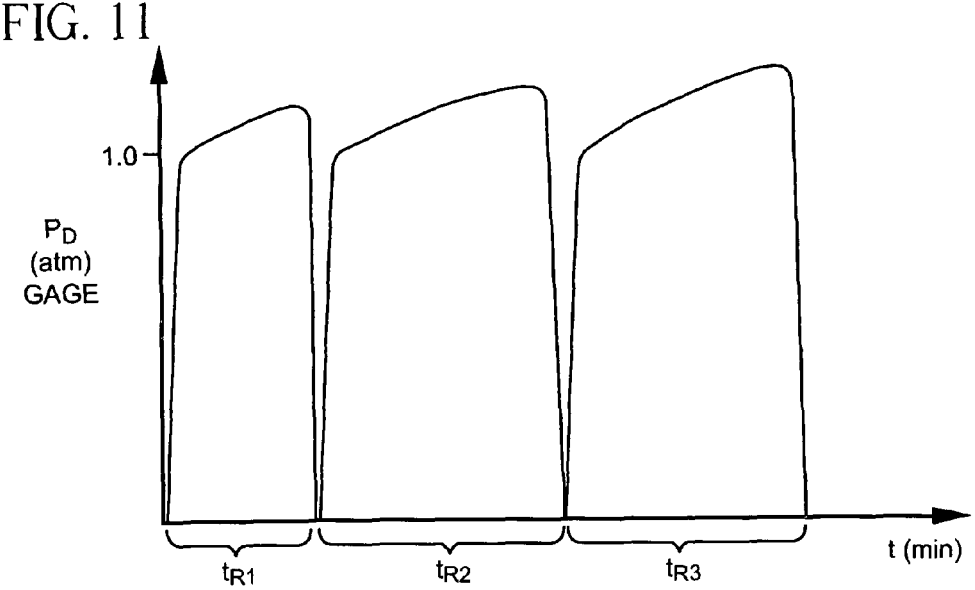
FIG. 11 is a graph of doping or drying pressure over time for further methods according to the present invention.

Moreover, the additional gas may be flowed into the chamber during the reacting times $t_{r1}$, $t_{r2}$, $t_{r3}$ such that the doping or drying pressure $P_D$ is increased over the course of the reacting times, for example, as illustrated in FIG. 11. Again, the additional gas may include the inert gas, the dopant gas, the drying gas, and/or another gas. In particular, the dopant or drying gas may be added to the doping or drying atmosphere 160 during the reacting times to more closely maintain the partial pressure of the dopant or drying gas in the doping or drying atmosphere at a constant level to promote doping or drying.

Figure 3:
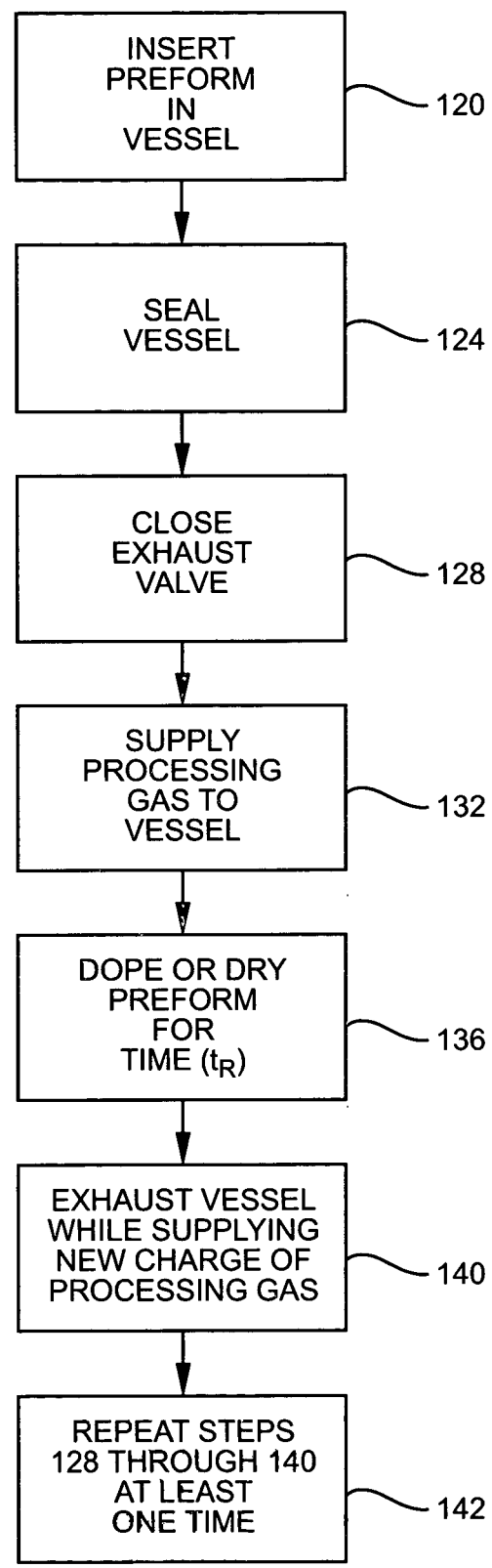
FIG. 3 is a flowchart representing further method embodiments of the present invention.

Further method embodiments of the present invention for doping or drying a soot preform 5 are represented by the flow chart of FIG. 3. In the methods of FIG. 3, the steps of Block 120, Block 124, Block 128, Block 132, and Block 136 correspond to the steps of Block 20, Block 24, Block 28, Block 32, and Block 36, respectively, of the methods of FIG. 1. The methods of FIG. 3 may be conducted using the doping or drying apparatus of FIG. 2, as described below, or using any other suitable apparatus such as the apparatus 200 and 300 discussed below. The methods will be described with regard to both doping and drying processes, it being understood that the references below to doping steps, doping cycles, dopant gases, doping atmosphere, doping pressure, doping temperature, and the like refer to a doping process, whereas the references below to drying steps, drying cycles, drying gases, drying atmosphere, drying pressure, drying temperature, and the like refer to a different, drying process.

Following the reacting time $t_R$, at least a portion of the doping or drying atmosphere 160 is exhausted from the chamber 114 through the outlet 122 while simultaneously introducing additional gas into the chamber through the inlet 120. The additional gas may be process gas including the dopant or drying gas or, alternatively, a flow of purging gas (e.g., an inert gas) followed by the process gas. Once a desired replacement doping or drying atmosphere has been introduced into the chamber 114, the steps of Block 128 to Block 140 are repeated (Block 142) to conduct a second doping or drying cycle. Third and further doping or drying cycles may also be conducted in the same manner.

The parameters and materials as discussed above with regard to the methods of FIG. 1 likewise apply to the methods of FIG. 3. For example, the doping and drying processes may use ambient doping or drying pressures or, alternatively, doping or drying pressures greater than ambient pressure. The second and further doping or drying cycles may be executed using different doping or drying pressures, different proportions of inert and dopant or drying gases, different doping or drying temperatures, and/or different reacting times.

Throughout the exhausting and refilling steps of Block 140 (i.e., between the doping step (Block 136) of the first doping cycle and the valve closing step (Block 128) of the second doping cycle), the pressure in the chamber 114 preferably remains between about 0.1 atm gage and 20 atm gage. Preferably, the pressure does not drop below the selected doping or drying pressure of the second doping or drying cycle.

Figure 12:
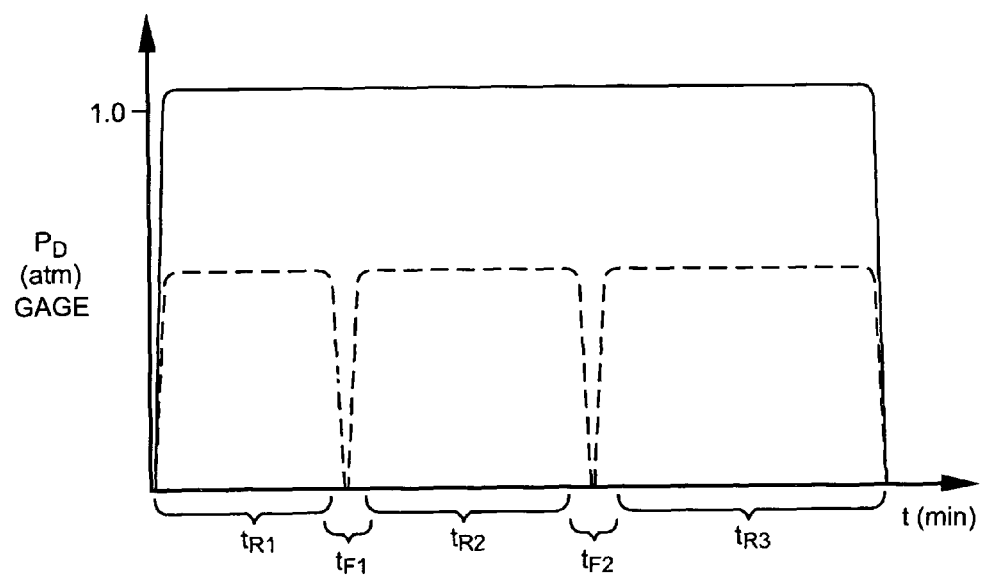
FIG. 12 is a graph of doping or drying pressure over time for further methods according to the present invention.

According to some embodiments of the invention, the doping or drying pressure $P_D$ may be controlled such that the value of the doping or drying pressure $P_D$ remains substantially constant (or above a selected threshold) between the doping/drying cycles as well as during the doping/drying cycles. For example, as shown in FIG. 12, a doping or drying process in accordance with the invention may include three doping/drying cycles having reacting times $t_{r1}$, $t_{r2}$ and $t_{r3}$, respectively. Between the first and second cycles, the chamber is purged and refilled with the second doping or drying atmosphere over a first refilling/purging time $t_{f1}$. Between the second and third cycles, the chamber is purged and refilled with the third doping or drying atmosphere over a second refilling/purging time $t_{f2}$.

The solid line curve shown in FIG. 12 represents the total doping or drying pressure $P_D$ (i.e., the total pressure of the doping or drying atmosphere) over time and the dashed line curve represents the partial pressure $PP_D$ of the dopant or drying gas in the doping or drying atmosphere. In a manner similar to that described above, during the reacting times $tr_1$, $tr_2$, $tr_3$, the dopant gas or drying gas and/or the inert gas are added to the doping atmosphere 160 as needed to maintain the doping or drying pressure $P_D$ at a constant level and thereby compensate for depletion of the dopant or drying agent in the doping atmosphere. In order to achieve the flat profile of the partial pressure $PP_D$ of the dopant or drying gas as illustrated in FIG. 12, dopant or drying gas typically may be added.

Additionally, during the refilling/purging times $t_{f1}$, $t_{f2}$, the inert gas and then the process gas may be added to the atmosphere in the chamber 114 as needed to maintain the total pressure in the vessel 112 at a constant level. Alternatively (not shown), the process gas may be used to purge the chamber 114 (i.e., without a period of flowing only inert gas), in which case the partial pressure $PP_D$ of the dopant or drying gas will not drop below the selected partial pressure as illustrated in FIG. 12.

In order to control the addition and exhaust of gases in and from the chamber, the apparatus 100 may be provided with an exhaust valve, for example, calibrated to open responsive to all pressures exceeding the selected doping or drying pressure $P_D$. Alternatively or additionally, the exhaust valves of the apparatus 100, 200 (discussed below), 300 (discussed below) may be opened and closed in a controlled manner as needed, for example, using the respective controllers and pressure sensors (e.g., the controllers 132 and the valve 137).

The methods described above with reference to FIG. 2 may provide certain advantages. By preventing or reducing fluctuations in the pressure in the chamber during the reacting times and between the reacting times (i.e., during the refilling and purging steps), fluctuations in the forces exerted on the vessel 112 are likewise reduced. As a result, flexing of the vessel walls is reduced, thereby reducing structural fatigue. The methods may also allow for more efficient and continuous doping or drying of soot preforms.

With reference to FIG. 4, a doping and/or drying apparatus 200 according to further embodiments of the present invention is shown therein. The apparatus 200 may be used in place of the apparatus 100 to conduct any of the methods described herein, and is preferred for conducting the methods of FIG. 3. The apparatus 200 corresponds to the apparatus 100 except for the provision of a modified fluid control system 230 in place of the fluid control system 130 and the additional provision of a handle drive system 270.

The fluid control system 230 includes a dopant gas supply 240, a drying gas supply 245, and an inert gas supply 250. The system 230 corresponds to the fluid control system 130 except that mass flow controllers (MFCs) 242, 248, 252 and 237 are used in place of the controllable on/off valves 142, 148, 152 and 137, respectively. The MFCs 242, 248, 252, 237 are each controlled by and return flow rate data to the controller 232. The MFCs 242, 248, 252, 237 may thereby provide more precise control of the process gas and purging gas flow rates into and out of the chamber 214 as well as the pressure in the chamber 114. The fluid control system 230 may be modified by replacing one or more of the MFCs 242, 248, 252, 237 with an on/off control valve.

The drive system 270 includes a drive motor 272 mounted on the exterior side of the end cover 212B and a transmission unit 274 mounted on the interior side of the end cover 212B. The drive motor 272 is magnetically coupled to the transmission unit 274 through the end cover 212B such that the transmission rotates the handle 218 and thereby the preform 5 (preferably and as shown, about a vertical axis). The drive system 270 allows rotation of the preform 5 without requiring a seal between relatively moving parts. The end cover 112B and the handle 118 of the apparatus 100 may be replaced with the end cover 212B and the drive system 270, and vice-versa.

Figure 5:
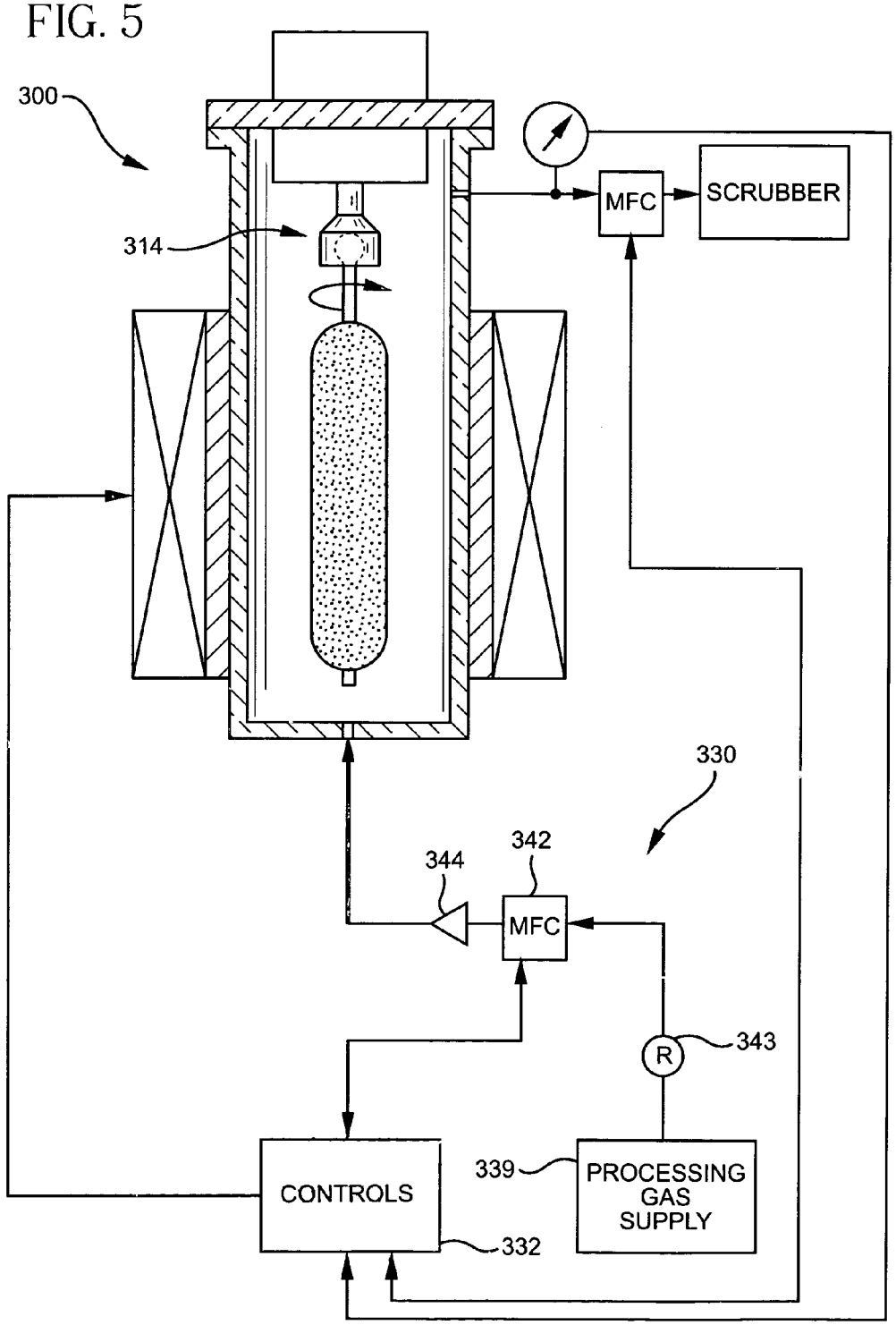
FIG. 5 is a schematic drawing of a doping and/or drying apparatus according to further embodiments of the present invention.

With reference to FIG. 5, a doping and/or drying apparatus 300 according to further embodiments of the present invention is shown therein. The apparatus 300 corresponds to the apparatus 200 except that the fluid control system 230 is replaced with a modified fluid control system 330. The system 330 corresponds to the system 230 except that the dopant gas supply 240 and the drying gas supply 245 are omitted and a process gas supply 339 is provided. The inert gas supply 250 and the conduit, regulator, MFC and check valve associated with the inert gas supply may be omitted. The process gas supply 339 may include a pressurized tank of the selected process gas. The controls 332, a regulator 343, an MFC 342 and a check valve 344 control delivery of the process gas to the chamber 314.

The process gas provided from the process gas supply 339 may be any suitable dopant or drying gas as described above. Alternatively, the process gas may be a pre-mixed mixture of a selected dopant or drying gas and a selected inert gas as described above. In the latter case, the mixture will include the doping or drying gas and the inert gas in the desired proportions for the desired doping or drying atmosphere. A second process gas supply may be provided. For example, a first process gas supply may be provided including a dopant gas (with or without an inert gas) and a second process gas supply may be provided including a drying gas (with or without an inert gas).

As described above, the gas supplies 140, 150, 240, 250, 339 may include pressurized tanks and be paired with suitable pressure regulators. Alternatively or additionally, compressors may be provided to deliver the respective gases to the chamber and to pressurize the doping atmosphere as needed.

Where a quartz muffle is used in each of the foregoing apparatus, the temperature in the chamber is preferably less than 1200° C. at any time the pressure in the chamber exceeds about atmospheric pressure. This is because the quartz may become unduly flexible when heated to temperatures of 1200° C. and above, and internal pressures exceeding the surrounding ambient pressure may cause the flexible muffle to deform or expand. Accordingly, special provision may be made as described below, to enable the drying step and the sintering step to be executed at doping temperature(s) exceeding 1200° C. when the doping pressure also exceeds atmospheric pressure.

Figure 6:
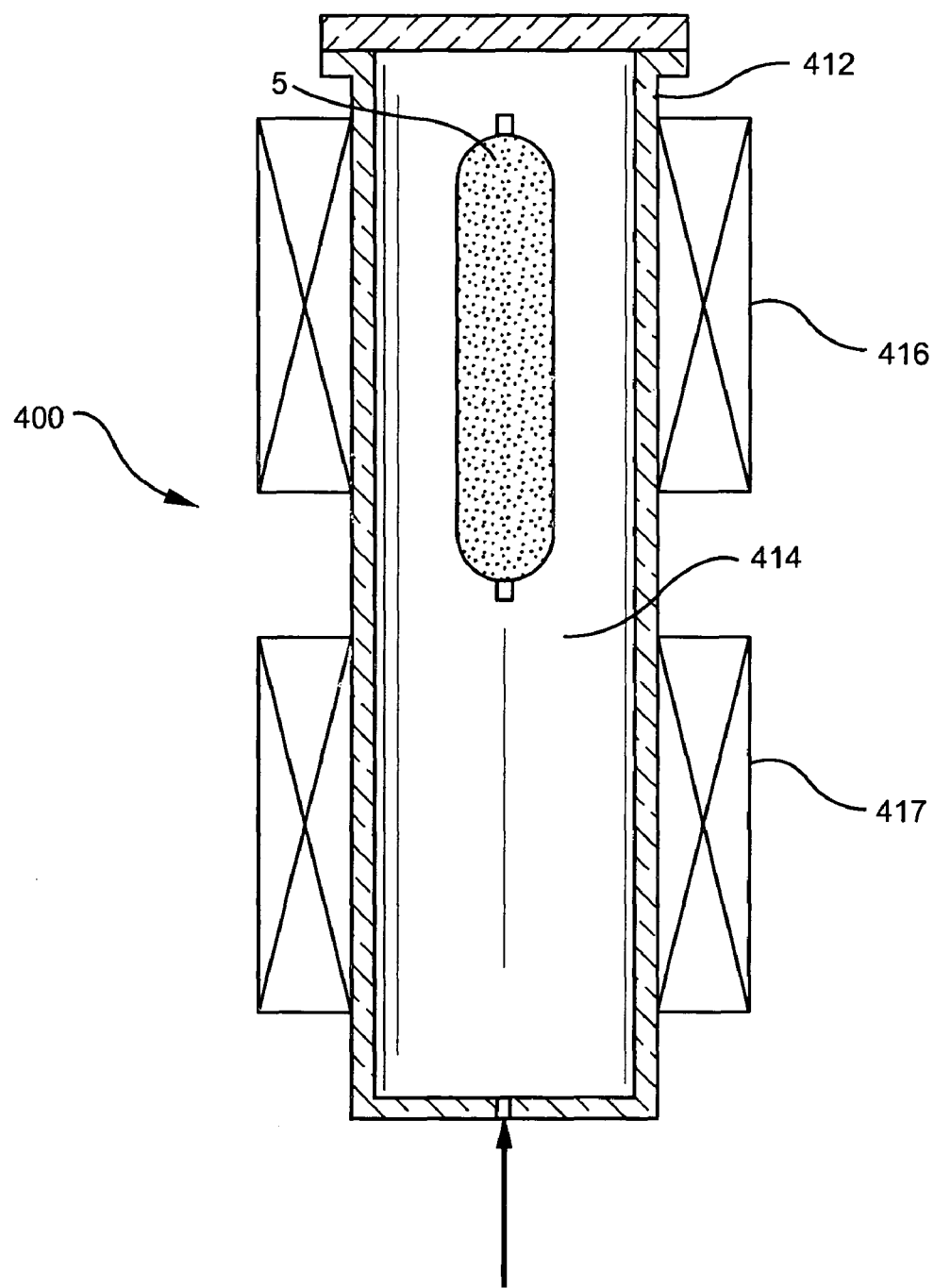
FIG. 6 is a schematic drawing of a doping or drying apparatus according to further embodiments of the present invention.

The temperature in the chamber may be varied for the drying, doping and sintering steps using a variable temperature heating device. Alternatively and with reference to FIG. 6, an apparatus 400 may be used. The apparatus 400 includes a pressure vessel 412 having a muffle formed of a material that does not significantly flex at the desired drying, doping and sintering temperatures. Suitable materials include alumina, graphite, silicon carbide, silicon nitride, and quartz, depending on the intended doping pressures.

Optionally, the apparatus 400 may include a first annular heating device 416 and a second annular heating device 417. The heating devices 416 and 417 are adapted to provide different temperatures or ranges of temperatures. One or both of the heating devices may be variable temperature heating devices. For example, the heating device 416 may heat the chamber 414 to temperatures suitable for drying and doping (e.g., between about 300 and 1350° C.) and the heating device 417 may heat the chamber 414 to temperatures suitable for sintering (e.g., between about 1350 and 1450° C.).

As the process transitions from drying to doping to sintering, the soot preform 5 may be relocated from adjacent the heating device 416 to adjacent the heating device 417 as appropriate. For example, the soot preform 5 may be moved, the heating devices 416, 417 may be moved, or both.

Figure 7:
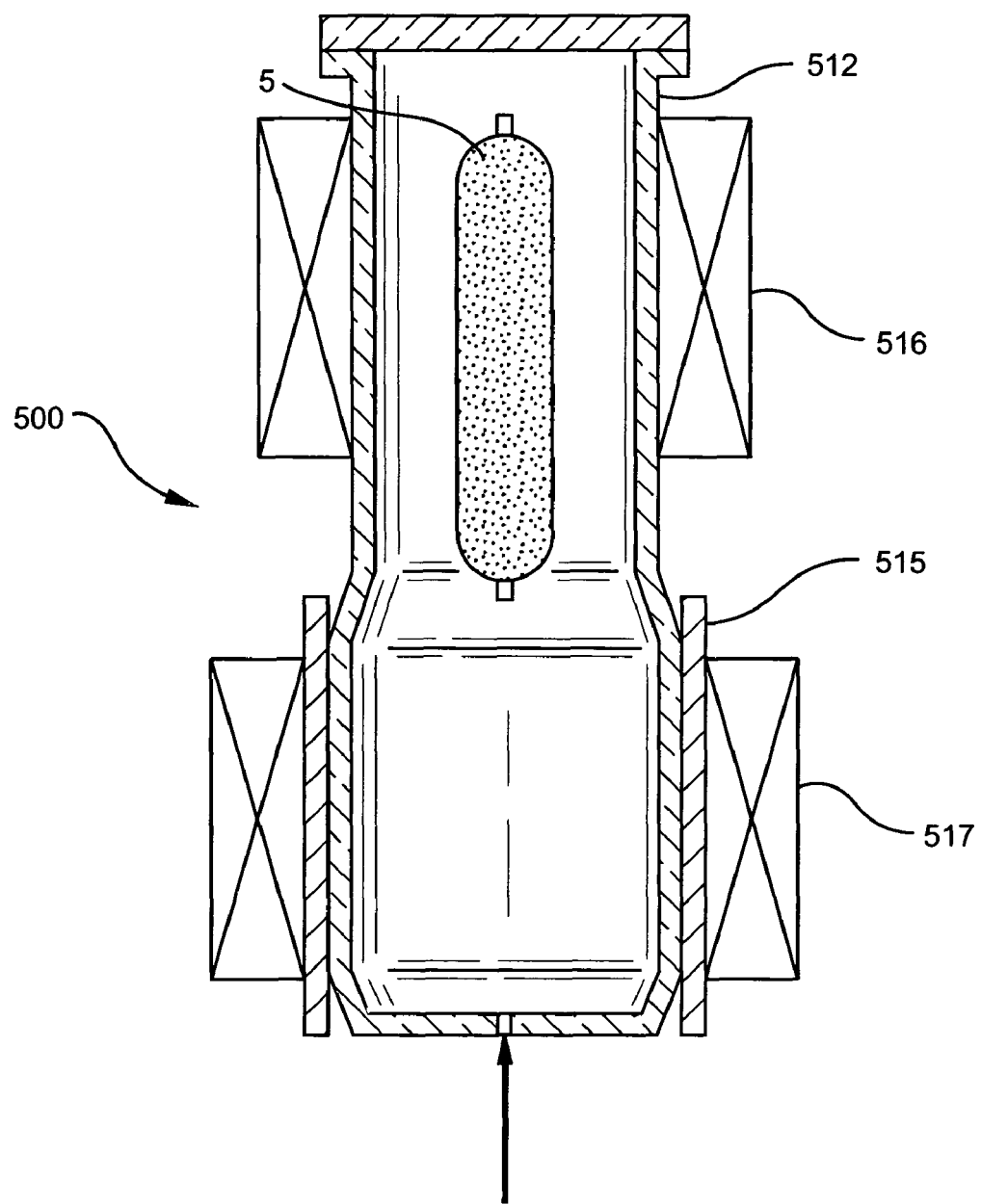
FIG. 7 is a schematic drawing of a doping and/or drying apparatus according to further embodiments of the present invention.

As a further alternative, an apparatus 500 as shown in FIG. 7 may be used. The apparatus 500 corresponds to the apparatus 400 except that the pressure vessel 512 may be formed of quartz. The apparatus 500 is further provided with an annular reinforcing sleeve 515 surrounding the vessel 512 and interposed between the vessel 512 and the heating device 517. The reinforcing sleeve 515 is preferably formed of alumina, silicon carbide, silicon nitride or graphite. In most instances, preferably, alumina would be employed.

For steps wherein a temperature of less than 1200° C. and/or a pressure of no greater than about atmospheric pressure is employed, the heating device 516 is used and the preform 5 is located within the heating device 516. For steps wherein a temperature of greater than 1200° C. and also a pressure of greater than atmospheric pressure are employed, the heating device 517 is used and the preform is located within the heating device 517. The reinforcing sleeve 515 abuts and braces the heated, pressure loaded portion of the vessel 512 within the heated zone to thereby limit deformation of the vessel 512.

Figure 8:
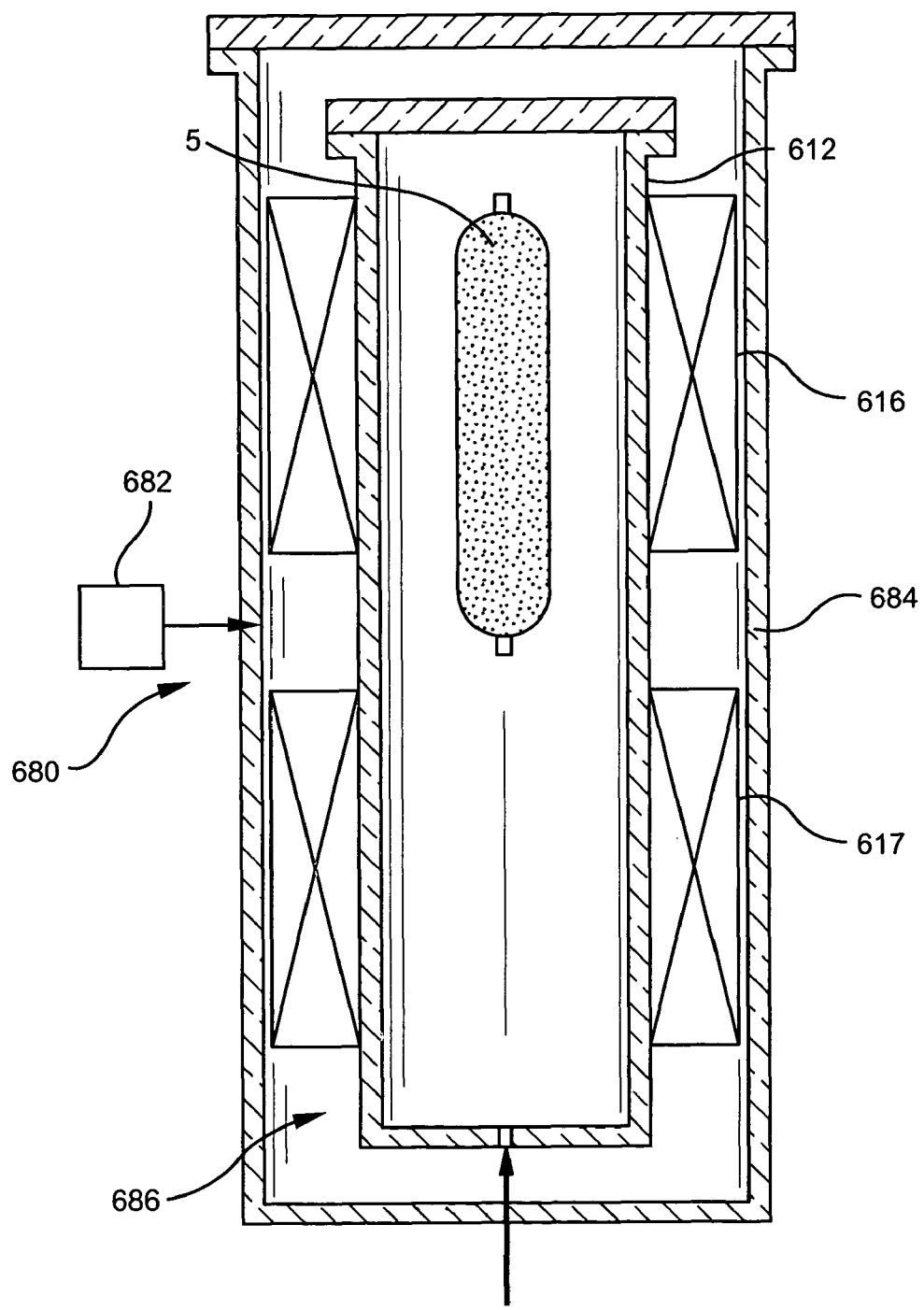
FIG. 8 is a schematic drawing of a doping and/or drying apparatus according to further embodiments of the present invention.

With reference to FIG. 8, a further alternative apparatus 600 is shown therein. The apparatus 600 corresponds to the apparatus 400 except that the pressure vessel 612 is formed of quartz and an equalizing system 680 is provided. The system 680 includes a secondary pressure vessel 684 surrounding and encapsulating the vessel 612 and defining a secondary chamber 686 between the interior surface of the vessel 684 and the exterior surface of the vessel 612. A pressurizing device (e.g., a compressor or pump) 682 is fluidly connected to the chamber 686 and is operative to selectively pressurize the chamber 686. The pressurizing gas may be air or other suitable gas or liquid. Alternatively (not shown), the heating devices 616, 617 may be disposed in the chamber 686.

In use, the pressurizing device 682 is operated to substantially equalize the pressure in the chamber 686 and the pressure in the chamber 612 at least when temperatures of about 1200° C. or greater are used. In this manner, the net force on the quartz vessel 612 is substantially zero and deformation of the vessel 612 is minimized or prevented. Preferably, the apparatus 600 is adapted to allow the vessel 612 to be pressurized to a gage pressure of at least 0.5 atm while heated to a temperature of at least 1000° C. without displacing the interior surface of the vessel 612 by more than 20%.

Each of the apparatus 100, 200, 300 and the various modified embodiments thereof as discussed above may be modified to include the features and configurations of the apparatus 400, 500 and 600.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

What is claimed is:

1. A method of manufacturing an optical waveguide preform, said method comprising the steps of:
   providing a first gaseous atmosphere including a first halogen-containing gas to a soot preform contained in a vessel, the first halogen-containing gas being selected from the group consisting of $SiF_4$, $SF_6$, $CF_4$, $C_2F_6$, $COF_2$, $C_2F_2Cl_2$, and $F_2$;
   maintaining the first gaseous atmosphere between 1100 and 1300° C., for a first reacting time sufficient to at least partially dope the soot preform, wherein the first halogen-containing gas has a partial pressure which decreases during the first reacting time, wherein no more than 0.5 slpm of the first gaseous atmosphere flows out of the vessel during the first reacting time, and wherein the first gaseous atmosphere is pressurized to a gage pressure of at least 0.1 atm gage during the first reacting time;
   evacuating at least a portion of the first gaseous atmosphere from the vessel;
   providing the vessel with a second gaseous atmosphere including a second halogen-containing gas, the second halogen-containing gas being selected from the group consisting of $SiF_4$, $SF_6$, $CF_4$, $C_2F_6$, $COF_2$, $C_2F_2Cl_2$, and $F_2$; and
   maintaining the second gaseous atmosphere between 1100 and 1300° C., for a second reacting time sufficient to further dope the soot preform, wherein the second halogen-containing gas has a partial pressure which decreases during the second reacting time, and wherein the second gaseous atmosphere is pressurized to a gage pressure of at least 0.1 atm gage during the second reacting time;
   wherein the soot preform is retained in the vessel throughout and between: the step of maintaining the first gaseous atmosphere, the step of evacuating at least a portion of the first gaseous atmosphere, the step of providing the second gaseous atmosphere, and the step of maintaining the second gaseous atmosphere.

2. The method of claim 1 further including, following said step of maintaining second gaseous atmosphere:
   providing the vessel with a third gaseous atmosphere including a third halogen-containing gas; and
   maintaining the third gaseous atmosphere in the vessel for a third reacting time sufficient to further dope the soot preform, wherein the third halogen-containing gas has a partial pressure which decreases during the third reacting time, wherein the soot preform is retained in the vessel throughout and between: the step of maintaining the second gaseous atmosphere, the step of providing the third gaseous atmosphere, and the step of maintaining the third gaseous atmosphere.

3. The method of claim 1 including depressurizing the first gaseous atmosphere about the soot preform at the end of the first reacting time.

4. The method of claim 1 wherein an inert gas is added to the atmosphere in the vessel during and between said steps of maintaining the first gaseous atmosphere and maintaining the second gaseous atmosphere.

5. The method of claim 1 wherein a fluorine-containing gas selected from the group consisting of $SiF_4$, $SF_6$, $CF_4$, $C_2F_6$, $COF_2$, $C_2F_2Cl_2$, and $F_2$ is added to the atmosphere in the vessel during at least one of the first and second reacting times.

6. The method of claim 1 further including the step of at least partially purging the vessel prior to said step of providing the vessel with the second gaseous atmosphere.

7. The method of claim 1 wherein:
   additional dopant gas is added to the atmosphere in the vessel during at least one of the first and second reacting times to compensate for the decreases in the partial pressure of the dopant gas resulting from reaction of the dopant gas with the soot preform.

8. The method of claim 1 including pressurizing an outer surface of the vessel to offset pressurization within the vessel.

9. The method of claim 1 including supporting a reinforcing sleeve about the vessel during at least the first and second reacting times.

10. The method of claim 1 including rotating the soot preform relative to the vessel and wherein the vessel is sealed.

11. The method of claim 1 including:
    drying the soot preform prior to said step of providing the first gaseous atmosphere; and
    sintering the soot preform following the second reacting time.

12. The method of claim 1 including:
    wherein the first gaseous atmosphere has a first pressure during the first reacting time; and wherein the second gaseous atmosphere has a second pressure during the second reacting time;
wherein the second pressure is different than the first pressure.

13. The method of claim 1 including increasing a total pressure of the first gaseous atmosphere in the vessel during the first reacting time.

14. The method of claim 1 wherein the first reacting time is between about 1 and 60 minutes.

15. The method of claim 1 wherein the second reacting time is between about 1 and 60 minutes.

16. The method of claim 1 wherein the second reacting time is longer than the first reacting time.

17. The method of claim 1 wherein the temperature of the second gaseous atmosphere is different than the temperature of the first gaseous atmosphere.

18. The method of claim 1 wherein the first and second gaseous atmospheres each include an inert gas selected from the group consisting of He, Ar, Ne, and $N_2$.

19. A method of manufacturing an optical waveguide preform, said method comprising the steps of:
providing a first gaseous atmosphere to a soot preform contained in a vessel, the first gaseous atmosphere including a fluorine-containing gas selected from the group consisting of $SiF_4$, $SF_6$, $CF_4$, $C_2F_6$, $COF_2$, $C_2F_2Cl_2$, and $F_2$;
maintaining the first gaseous atmosphere between 1100 and 1300° C., for a first reacting time of between about 1 and 60 minutes to at least partially dope the soot preform, wherein the first fluorine-containing gas has a partial pressure which decreases during the first reacting time, wherein no more than 0.5 slpm of the first gaseous atmosphere flows out of the vessel during the first reacting time, and wherein the first gaseous atmosphere is pressurized to a gage pressure of at least 0.1 atm gage during the first reacting time;
evacuating at least a portion of the first gaseous atmosphere from the vessel at the end of the first reacting time; then
providing the vessel with a second gaseous atmosphere, the second gaseous atmosphere including a fluorine-containing gas selected from the group consisting of $SiF_4$, $SF_6$, $CF_4$, $C_2F_6$, $COF_2$, $C_2F_2Cl_2$, and $F_2$; and maintaining the second gaseous atmosphere between 1100 and 1300° C., for a second reacting time sufficient to further dope the soot preform, wherein the second fluorine-containing gas has a partial pressure which decreases during the second reacting time, and wherein the second gaseous atmosphere is pressurized to a gage pressure of at least 0.1 atm gage during the second reacting time;
wherein the soot preform is retained in the vessel throughout and between: the step of maintaining the first gaseous atmosphere, the step of evacuating at least a portion of the first gaseous atmosphere, the step of providing the vessel with the second gaseous atmosphere, and the step of maintaining the second gaseous atmosphere.

20. The method of claim 19 including the step of depressurizing the first gaseous atmosphere about the soot preform at the end of the first reacting time.

21. The method of claim 20 wherein the vessel is substantially completely gas-sealed throughout both of said steps of maintaining the first and second gaseous atmospheres.

22. The method of claim 20 further including, following said step of depressurizing the doping atmosphere, the steps of:
replacing at least a portion of the first gaseous atmosphere with a second gaseous atmosphere about the soot preform, the second gaseous atmosphere being selected from the group consisting of $SiF_4$, $SF_6$, $CF_4$, $C_2F_6$, $COF_2$, $C_2F_2Cl_2$, and $F_2$; and
pressurizing the second gaseous atmosphere about the soot preform, and maintaining the second gaseous atmosphere between 1100 and 1300° C., for a second reacting time of no more than 60 minutes to further dope the soot preform.

23. The method of claim 22 wherein said step of pressurizing the second gaseous atmosphere includes pressurizing the second gaseous atmosphere to a gage pressure of at least 0.1 atm.

24. The method of claim 23 wherein said step of pressurizing the second gaseous atmosphere includes pressurizing the second gaseous atmosphere to a gage pressure of at least 0.5 atm.

25. The method of claim 22 wherein the second reacting time is between about 5 and 30 minutes.

26. The method of claim 22 wherein said step of pressurizing the second gaseous atmosphere includes heating the second gaseous atmosphere to a temperature of between about 1125 and 1300° C.

27. The method of claim 19 including pressurizing an outer surface of the vessel to offset the pressurizing within the vessel.

28. The method of claim 19 including rotating the soot preform relative to the vessel.

29. The method of claim 19 including:
drying the soot preform prior to said step of providing the first gaseous atmosphere; and
sintering the soot preform following the first reacting time.

30. The method of claim 19 wherein the first gaseous atmosphere has a gage pressure of at least 0.5 atm gage.

31. The method of claim 19 wherein the first reacting time is between about 5 and 30 minutes.

32. A method of manufacturing an optical waveguide preform, said method comprising the steps of:
flowing a process gas into a vessel to provide a gaseous atmosphere in the vessel about a soot preform, the process gas including a first gas selected from the group consisting of $SiF_4$, $SF_6$, $CF_4$, $C_2F_6$, $COF_2$, $C_2F_2Cl_2$, and $F_2$;
maintaining the gaseous atmosphere between 1100 and 1300° C., for a reacting time sufficient to at least partially dope the soot preform, wherein the first gas has a partial pressure which decreases during the reacting time, wherein no more than 0.5 slpm of the gaseous atmosphere flows out of the vessel during the reacting time, and wherein the gaseous atmosphere is pressurized about the soot preform to greater than ambient pressure during the reacting time; and
evacuating at least a portion of the gaseous atmosphere from the vessel at the end of the reacting time.

33. The method of claim 32 further including flowing a makeup gas into the vessel during the reacting time.

34. The method of claim 33 wherein the flow rate of the makeup gas is provided to at least partially offset for any pressure loss due to the first gas reacting with the preform.

35. The method of claim 32 including flowing an additional amount of the process gas into the vessel to form a second gaseous atmosphere in the vessel about the soot preform following said step of evacuating at least a portion of the gaseous atmosphere from the vessel, wherein the soot preform is retained in the vessel throughout and between the step of flowing the process gas into the vessel, the step of maintaining the gaseous atmosphere, the step of evacuating at least a portion of the gaseous atmosphere, and the step of flowing an additional amount of the process gas into the vessel.

36. A method of manufacturing an optical waveguide preform, said method comprising the steps of:
   providing a soot preform contained in a vessel;
   adding a quantity of a first gas to the vessel to provide a first gaseous atmosphere to the soot preform, the first gas being selected from the group consisting of $SiF_4$, $SF_6$, $CF_4$, $C_2F_6$, $COF_2$, $C_2F_2Cl_2$, and $F_2$;
   maintaining the first gaseous atmosphere between 1100 and 1300° C., for a first reacting time sufficient to at least partially dope the soot preform, wherein the first gas has a partial pressure which decreases during the first reacting time, wherein the first gaseous atmosphere is pressurized to a first pressure greater than ambient pressure, and wherein no more than 0.5 slpm of the first gaseous atmosphere flows out of the vessel during the first reacting time; then
   adding a quantity of a second gas to the vessel to provide a second gaseous atmosphere to the soot preform, the second gas being selected from the group consisting of $SiF_4$, $SF_6$, $CF_4$, $C_2F_6$, $COF_2$, $C_2F_2Cl_2$, and $F_2$; and
   maintaining the second gaseous atmosphere between 1100 and 1300° C., for a second reacting time sufficient to at least partially dope the soot preform, wherein the second gas has a partial pressure which decreases during the second reacting time, wherein the second gaseous atmosphere is pressurized to a second pressure greater than ambient pressure, and wherein no more than 0.5 slpm of the second gaseous atmosphere flows out of the vessel during the second reacting time;
   wherein the soot preform is retained in the vessel throughout and between the step of adding a quantity of a first gas, the step of maintaining the first gaseous atmosphere, the step of adding a quantity of a second gas, and the step of maintaining the second gaseous atmosphere.

37. The method of claim 36 wherein the vessel is sealed gas-tight throughout the first reacting time.

38. The method of claim 37 wherein the vessel is sealed gas-tight throughout the second reacting time.

39. The method of claim 36 wherein at least a portion of the first gaseous atmosphere is evacuated from the vessel at the end of the first reacting time.

40. The method of claim 36 wherein at least a portion of the second gaseous atmosphere is evacuated from the vessel at the end of the second reacting time.

41. The method of claim 36 wherein no more than 0.1 slpm of the first gaseous atmosphere flows out of the vessel during the first reacting time.

42. The method of claim 36 wherein no more than 0.1 slpm of the second gaseous atmosphere flows out of the vessel during the second reacting time.

43. A method of manufacturing an optical waveguide preform, said method comprising the steps of:
   providing a soot preform contained in a vessel;
   adding a quantity of a first fluorine-containing gas to the vessel to provide a first gaseous atmosphere to the soot preform, the first gas being selected from the group consisting of $SiF_4$, $SF_6$, $CF_4$, $C_2F_6$, $COF_2$, $C_2F_2Cl_2$, and $F_2$; then,
   sealing the vessel gas-tight and maintaining the first gaseous atmosphere between 1100 and 1300° C., for a first reacting time sufficient to dope the soot preform, wherein the first gas has a partial pressure which decreases during the first reacting time as the soot preform is doped, wherein the first gaseous atmosphere is pressurized to a first pressure greater than ambient pressure during the first reacting time; then,
   evacuating at least a portion of the first gaseous atmosphere from the vessel; then,
   adding a quantity of a second fluorine-containing gas to the vessel to provide a second gaseous atmosphere to the soot preform, the second gas being selected from the group consisting of $SiF_4$, $SF_6$, $CF_4$, $C_2F_6$, $COF_2$, $C_2F_2Cl_2$, and $F_2$; then,
   sealing the vessel gas-tight and maintaining the soot preform in contact with the second gaseous atmosphere within the vessel, and maintaining the second gaseous atmosphere between 1100 and 1300° C., for a second reacting time sufficient to further dope the soot preform, wherein the second gas has a partial pressure which decreases during the second reacting time as the soot preform is doped, wherein the second gaseous atmosphere is pressurized to a second pressure greater than ambient pressure during the second reacting time;
   wherein the soot preform is retained in the vessel throughout and between the step of adding a quantity of a first fluorine-containing gas, the step of sealing the vessel gas-tight and maintaining the soot preform in contact with the first gaseous atmosphere, the step of evacuating at least a portion of the first gaseous atmosphere from the vessel, the step of adding a quantity of a second fluorine-containing gas, and the step of sealing the vessel gas-tight and maintaining the soot preform in contact with the second gaseous atmosphere.

44. A method of manufacturing an optical waveguide preform, said method comprising the steps of:
   providing a soot preform contained in a vessel;
   adding a quantity of a first fluorine-containing gas to the vessel and in contact with the soot preform to provide a first gaseous atmosphere to the soot preform, the first gas being selected from the group consisting of $SiF_4$, $SF_6$, $CF_4$, $C_2F_6$, $COF_2$, $C_2F_2Cl_2$, and $F_2$; then,
   interrupting the adding of the first fluorine-containing gas into the vessel and maintaining the soot preform in contact with the first gaseous atmosphere within the vessel, and maintaining the first gaseous atmosphere between 1100 and 1300° C., for a first reacting time sufficient to dope the soot preform, wherein the first gas has a partial pressure which decreases during the first reacting time as the soot preform is doped, wherein the first gaseous atmosphere is pressurized to a first pressure greater than ambient pressure during the first reacting time; then,
   evacuating at least a portion of the first gaseous atmosphere from the vessel; then,
   adding a quantity of a second fluorine-containing gas to the vessel to provide a second gaseous atmosphere to the soot preform, the second gas being selected from the group consisting of $SiF_4$, $SF_6$, $CF_4$, $C_2F_6$, $COF_2$, $C_2F_2Cl_2$, and $F_2$; then,
   interrupting the adding of the second fluorine-containing gas into the vessel and maintaining the soot preform in contact with the second gaseous atmosphere within the vessel, and maintaining the second gaseous atmosphere between 1100 and 1300° C., for a second reacting time sufficient to further dope the soot preform, wherein the second gas has a partial pressure which decreases during the second reacting time as the soot preform is doped, wherein the second gaseous atmosphere is pressurized to a second pressure greater than ambient pressure during the second reacting time;
   wherein the soot preform is retained in the vessel throughout and between the step of adding a quantity of a first fluorine-containing gas, the step of interrupting the adding of the first fluorine-containing gas and maintaining the soot preform in contact with the first gaseous atmosphere, the step of evacuating at least a portion of the first gaseous atmosphere from the vessel, the step of adding a quantity of a second fluorine-containing gas, and the step of interrupting the adding of the second fluorine-containing gas and maintaining the soot preform in contact with the second gaseous atmosphere.

* * * * *